United States Patent [19]

Togawa

[11] Patent Number: 5,375,112
[45] Date of Patent: Dec. 20, 1994

[54] METHOD OF WRITING AND READING INFORMATION ON AND FROM OPTICAL CARD

[75] Inventor: Tsuyoshi Togawa, Hino, Japan

[73] Assignee: Olympus Optical Co., Ltd., Tokyo, Japan

[21] Appl. No.: 984,482

[22] Filed: Dec. 2, 1992

[30] Foreign Application Priority Data

Dec. 6, 1991 [JP] Japan ................................ 3-323223

[51] Int. Cl.$^5$ ................................................. G11B 5/86
[52] U.S. Cl. ........................................ 369/15; 369/32; 369/47; 369/44.37; 235/454
[58] Field of Search ........................ 369/14, 15, 13, 54, 369/47, 48, 275.2, 32; 235/454

[56] References Cited

U.S. PATENT DOCUMENTS

| | | | |
|---|---|---|---|
| 4,056,712 | 11/1977 | Trenkamp et al. | 369/14 |
| 4,609,812 | 9/1986 | Drexler | 369/14 |
| 4,894,817 | 1/1990 | Tanaka et al. | 369/54 |

FOREIGN PATENT DOCUMENTS 61-283032 12/1986 Japan ...................... 369/15

OTHER PUBLICATIONS

T. Ishida, et al "High Speed Optical Card Reader/Writer using Two Optical Sources", Electronic Information Communication Society, 1989, Autumn, C-325, p. 4-265.

Primary Examiner—Robert J. Pascal
Assistant Examiner—Tan Dinh
Attorney, Agent, or Firm—Stevens, Davis, Miller & Mosher

[57] ABSTRACT

In a method of writing and reading information on and from an optical card, to record new data immediately after an end of a previously recorded area without providing a gap therebetween, a timing of a write command signal is adjusted in accordance with a distance between writing and reading light spots on the optical card. The distance between the writing and reading light spots is measured by utilizing these light spots. A pit is formed on the optical card by the writing light spot, and the thus formed pit is detected by the reading light spot. Then, the distance may be measured by deriving a product of a constant moving speed of the optical card and a time period from an instant at which the pit is recorded to an instant at which the relevant pit is detected. An undesired bit jitter can be removed, while various optical systems of an optical head can be assembled easily; thus, a manufacturing cost of the optical head can be reduced.

12 Claims, 10 Drawing Sheets

FIG. 1
PRIOR ART

FIG_2
PRIOR ART

FIG_3
PRIOR ART

FIG_4

FIG_5

FIG_6

FIG_7

FIG_8

FIG_10

FIG._11

FIG_12

FIG_13

METHOD OF WRITING AND READING INFORMATION ON AND FROM OPTICAL CARD

Background of the Invention

1. Field of the Invention

The present invention relates to a method of writing and reading information on and from an card-like optical record medium by using an information writing and reading apparatus comprising a writing optical system for writing the information on the optical record medium by irradiating a writing light beam thereon and for reading the information out of the optical record medium by irradiating a reading light beam onto the optical record medium.

2. Description of the Related Art

Recently the information industry has been highly developed, and an amount of information used by individual persons has become larger and larger. Therefore, it has been desired to use an optical card which can bear a large amount of information and which can be easily carried with a user.

In a record area of the optical card, there are provided a number of rectilinear tracks, and each track is divided into a plurality of sectors. A sector comprises a preformat field including track number portion, sector number portion, CRC (cyclic redundancy check code) portion and a data field in which data has been recorded or is to be recorded. In order to compensate for a difference between a bit rate during the writing and that during the reading, there are provided gaps between successive sectors. That is to say, the sectors could not be read out continuously, but have to be read separately.

Further in order to read the data within a short time period, at a front end of each sector there are provided a preamble portion, and a synchronizing portion and at a rear end of each sector there are provided a synchronizing portion and a postamble portion.

In case of writing information on an optical card of write-once type, preamble and synchronizing portions are first written after the last sector in which data has been written, while a gap is formed therebetween; then new data is written in the data portion, and after that synchronizing and postamble portions are written. In this manner, in the known method of writing the information on the optical card, each time the data is written on the optical card, it is necessary to provide a gap between successive sectors and to write the preamble and postamble portions, so that the redundancy is liable to be large and the format efficiency is low.

Figure 1:
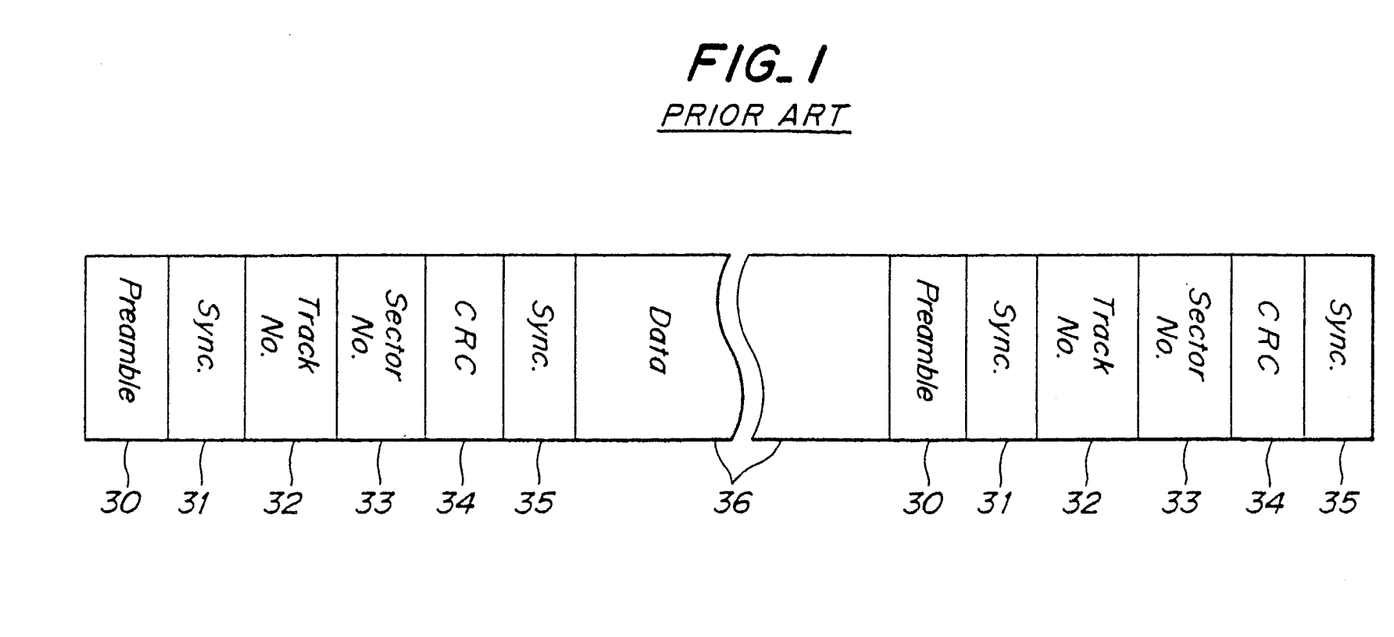
FIG. 1 is a schematic view showing the track format of a known optical card.

OMCF Optical Memory Card Forum has proposed a new format in which the format efficiency can be increased. FIG. 1 shows this new track format. In this track format, preamble portion 30, synchronizing portion 31, track number portion 32, sector number portion 33, CRC portion 34 and synchronizing portion 35 are recorded in this order in the preformat field, and then a data field 36 is provided.

In the above mentioned track format proposed by OMCF, when new data is to be written, the synchronizing portion in the previously recorded preformat field is utilized to take a synchronization, and the new data is written in the data field immediately after the end of a preformat field without providing a gap therebetween. In this case the new data is written in accordance with a modulation rule which is same as that which was used in writing the data in the preceding sector. Subsequent to the data recording, a preformat field of a next sector including the preamble portion, synchronizing portion, track number portion, sector number portion, CRC portion and synchronizing portion are written, said next sector will be used for writing next new data.

Now the operation of writing data on the optical card of write-once type will be explained. At first, the previously recorded area in a track on the optical card is read out to derive a read signal, and then the read signal is demodulated by converting it into a bivalent signal. Next the rear end of the previously recorded area is detected from the demodulated signal to produce a write command signal, and in response to this write command signal, a laser diode driving signal is modulated in accordance with new data to be recorded in a next sector. The thus modulated driving signal is supplied to a laser diode driving circuit, and the intensity of a writing laser beam is modulated in accordance with the modulated driving signal. In this manner, as soon as the rear end of the previously recorded area is detected, the new data is recorded in the next sector. In this manner successive sectors can be formed continuously without producing a gap therebetween, and the format efficiency of the optical card is improved.

However, in practice, there are produced various delays such as a delay of the read signal with respect to the optical head scanning, a digital delay due to the bivalent signal conversion, a delay due to the demodulation and a delay due to a filtering process, so that the timing of writing data might be delayed with respect to the timing of detecting the rear end of the previously recorded area. Then, a distance between the last pit of the previously recorded portion and a first pit of the newly recorded data is increased. This increase in the distance might not be ignored, especially when the recording bit rate is high. This result in a bit jitter which could not be compensated for. In an extreme case, the clock bit and the data bit might be read out in an inverted fashion, and the data could not be read out correctly.

In order to remove such a problem there has been proposed a method of writing and reading information on and from an optical card, in which a timing of a write command signal is corrected in accordance with the above mentioned delay. That is to say, when a predetermined pit in the preformat field, e.g. the last pit of the CRC portion is detected, a write command signal is generated and then this write command signal is delayed in accordance with the above mentioned delay such that the new data can be recorded at correct position on the optical card. This method is satisfactory as long as the information writing and reading are performed by changing the intensity level of a single light beam. However, this solution could not be effectively applied to an information writing and reading apparatus in which the writing and reading are performed by different light beams which are made incident upon the optical card at different points. Such an apparatus is disclosed in a Japanese article, "Electronic Information Communication Society", 1989, Autumn, C-325, p. 4–265. In case of using such an apparatus, the reading light spot is advanced with respect to the reading light spot viewed in the scanning direction, so that the write command signal has to be delayed with respect to a timing at which the detection of the end of the previously recorded portion is detected in addition to the above mentioned delay. However, a distance between the writing beam spot and the reading light spot on the optical card could not be fixedly determined.

The moving speed of the optical card with respect to the optical head can be easily and accurately detected by measuring a moving speed of the optical card with the aid of a linear encoder or by measuring a rotational speed of a motor for driving the optical card with respect to the optical head. However, the distance between the writing beamspot and the reading light spot on the optical card could not be set to a predetermined value due to tolerances and deviations of various optical components constituting the optical head. In other words, in order to set the distance between the writing and reading light spots to the predetermined value, the assembling operation of these optical components becomes extremely complicated and time-consuming, so that the manufacturing cost of the optical head might be increased.

If the timing of the recording is delayed with respect to the correct timing, there is a gap between the previously recorded area and a newly recorded data, and if the timing of the recording is advanced with respect to the correct timing, the new data is recorded in superimposition on the previously recorded area, which results in an undesired overwrite.

SUMMARY OF THE INVENTION

The present invention has for its object to provide a novel and useful method of writing and reading information on and from a card-like optical record medium, in which the information can be written on the optical card in a correct manner by compensating for the fluctuation of the distance between the writing light spot and the reading light spot on the optical record medium.

According to the invention, a method of writing and reading information on and from a card-like optical record medium comprises the steps of:

projecting a writing light beam onto the optical record medium to form a writing light spot;

projecting a reading light beam onto the optical record medium to form a reading light spot at a position which is separated from a position at which said writing light spot is formed;

measuring a distance between said writing light spot and said reading light spot formed on the optical record medium by using the writing and reading light spots;

storing said measured distance between said writing light spot and said reading light spot formed on the optical record medium;

generating a write command signal by reading a previously recorded area on the optical record medium;

correcting a timing of said write command signal in accordance with said measured distance such that new data can be written on the optical record medium immediately after an end of said previously recorded area to produce a corrected write command signal; and recording the new data on the optical record medium by said writing light beam in response to said corrected write command signal.

In a preferable embodiment of the method according to the invention, said distance between the writing light spot and the reading light spot is measured as a product of a constant moving speed of the optical record medium and a time period from a time instant at which a pit is formed on the optical record medium by said writing light spot to a time instant at which said pit on the optical record medium is read out by said reading light spot. Alternatively, this distance may be measured by directly detecting a distance over which the optical record medium has moved during said time period with the aid of a linear scale.

Further, the distance between the writing light spot and the reading light spot on the optical record medium may be detected by utilizing a previously recorded pit without actually recording a pit. In this case, a special pit among a number of previously recorded pits is selected, and this special pit is detected by both the writing and reading light spots, while the intensity of the writing light spot is reduced to a reading intensity level.

In the method according to the invention, the write command signal is adjusted in accordance with the actually measured distance between the writing light spot and the reading light spot formed on the optical record medium, and thus the new data can be recorded at a correct position on the optical record medium without providing an undesired gap or overwrite.

DESCRIPTION OF THE PREFERRED EMBODIMENT

Now the present invention will be explained with reference to an embodiment, in which the scanning is performed by moving an optical card with respect to stationary writing and reading light spots. A relative movement of the optical card and the reading light spot in a seek direction perpendicular to a track direction in which tracks extend is carried out by moving the reading light spot in the seek direction. However, according to the invention the scanning may be performed by moving the optical head in the track direction, and the seek operation may be effected by moving the optical card in the seek direction.

Figure 2:
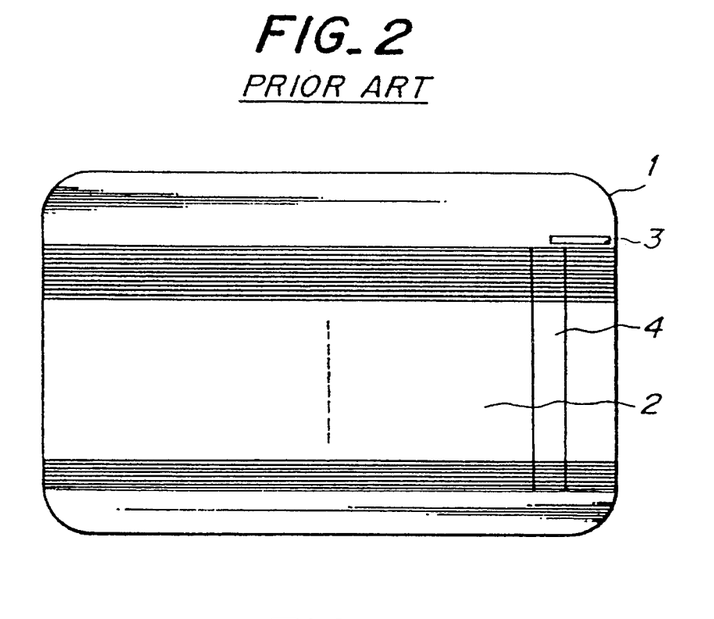
FIG. 2 is a schematic plan view illustrating the construction of a known optical card which can be advantageously used in the method according to the invention.
Figure 3:
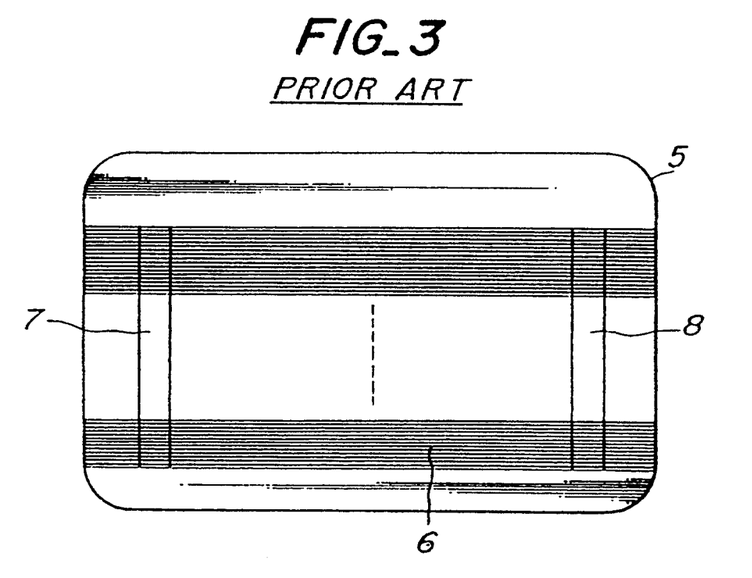
FIG. 3 is a schematic plan view illustrating the construction of another known optical card which can also be advantageously used in the method according to the invention.

FIG. 2 is a plan view showing the construction of an optical card which has been proposed by OMCF, and FIG. 3 is a plan view illustrating the construction of another optical card which has been proposed in Japanese Patent Laid-open Publication Kokai Sho No. 63-37,876. The optical card 1 shown in FIG. 2 comprises a data region 2, a card number record area 3 in which a card number indicating the relevant card is recorded, and an ID portion 4 provided on one side of the data region 2. When the optical card 1 is used, the writing operation is performed by moving the optical card only in one predetermined direction with respect to the light beams, but the reading operation can be carried out by moving the optical card in both directions, so that the data can be read out of the optical card 1 within a short time period. The optical card 5 depicted in FIG. 3 comprises a data region 6 and ID portions 7 and 8 provided on respective sides of the data region 6. When this optical card 5 is used, the writing and reading can be carried out by moving the optical card with respect to the light beams in both directions.

Figure 4:
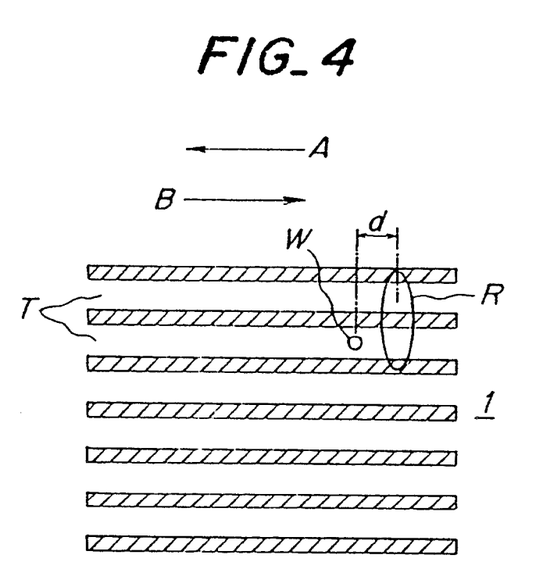
FIG. 4 is a positional relation of the writing and reading light spots on the optical card, while the optical card is moved in 2the first direction.

At first, the method according to the invention in which the optical card 1 shown in FIG. 2 is used will be explained. As explained above, in case of using this optical card 1, data is written on the optical card by moving it in a predetermined direction A as shown in FIG. 4. On the optical card 1, there are formed a writing light spot W and a reading light spot R at positions which are separated from each other in the track direction in which tracks T extend. The size of the writing light spot W is smaller than that of the reading light spot R, because two adjacent tracks T are read out simultaneously. It should be noted that the information writing and reading apparatus producing the writing and reading light spots has been known, so that the construction of the apparatus will be explained briefly.

Figure 6:
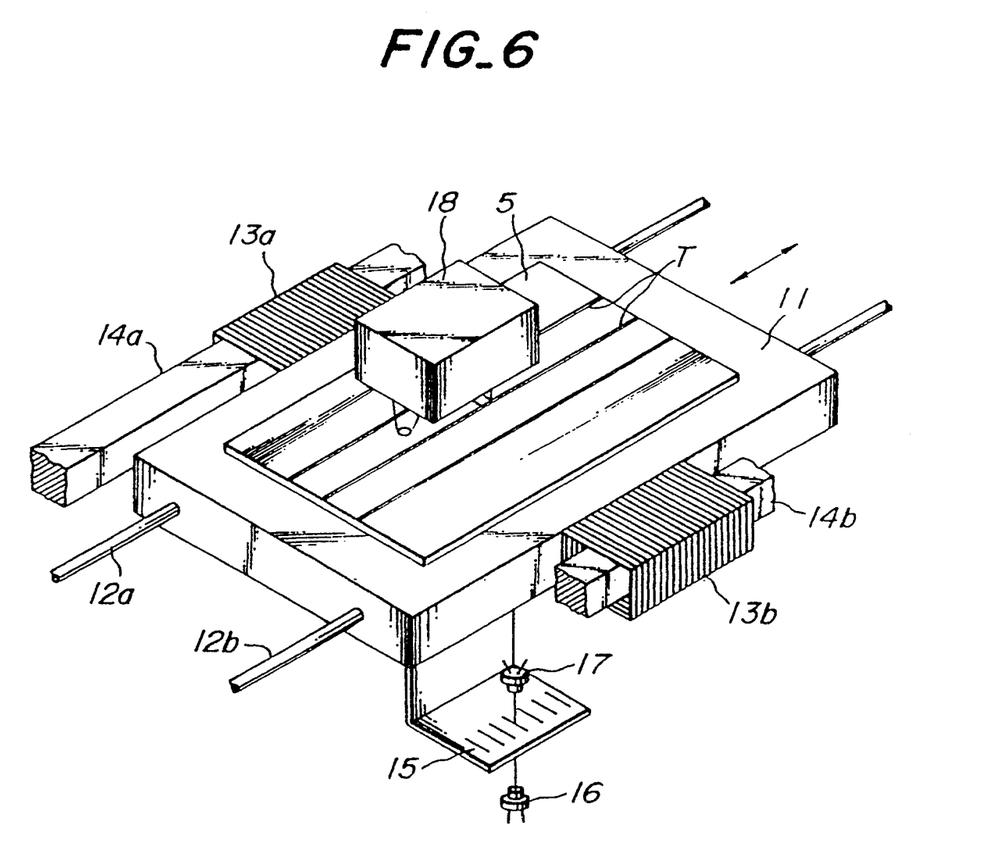
FIG. 6 is a perspective view showing an embodiment of the optical card driving device for moving the optical card in the track direction.

FIG. 6 is a perspective view showing an embodiment of the driving mechanism for moving the optical card in the track direction. The optical card 5 is supported by a shuttle 11, and the shuttle is supported by a pair of parallel guide rods 12a and 12b b movably in the track direction in which the tracks T on the optical card 5 extends. On opposite side walls of the shuttle 11 there are secured coils 13a and 13b through which permanent magnets 14a and 14b are inserted respectively to constitute the linear motors. Therefore, by supplying driving currents to the coils 13a and 13b in desired senses, the shuttle 11 can be moved in any direction along the track direction. To the shuttle 11 there is secured a linear encoder 15, and a light source 16 and a photodetector 17 are secured to a stationary member not shown such that the linear encoder is moved between the light source and the photodetector. In this manner, the distance over which the shuttle 11, i.e. the optical card 5 is moved can be measured accurately by processing an output signal of the photodetector 17. Above the shuttle 11 there is further arranged an optical head 18 for projecting both the writing light beam and reading light beam.

Figure 7:
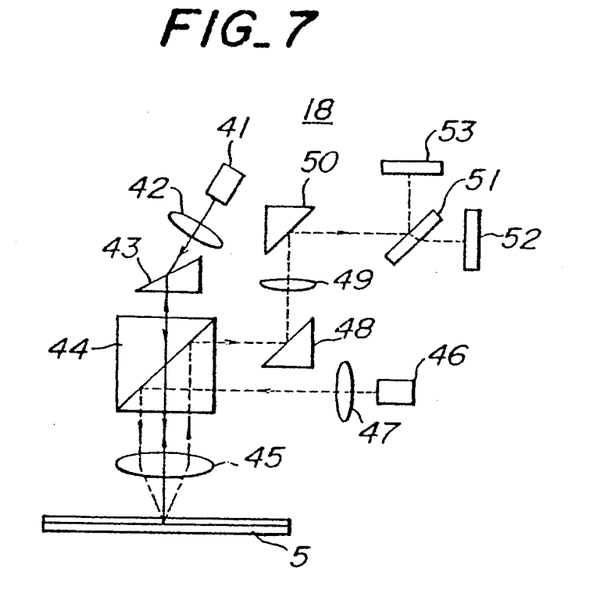
FIG. 7 is a schematic view illustrating an embodiment of the optical head for projecting the writing and reading light beams onto the optical card.

FIG. 7 is a schematic view illustrating an embodiment of the optical head 18 provided above the shuttle 11. The optical head comprises a laser diode 41 for emitting a writing light beam. The laser beam emitted by the laser diode 41 is converted into a parallel beam by means of a collimator lens 42 and then is made incident upon a prism 43 for correcting a cross sectional shape of the laser beam into a circular cross section. The laser beam emanating from the prism 43 is transmitted through a beam splitter 44 and is made incident upon an objective lens 45. Then the laser beam is made incident upon the optical card 5 to form the writing light spot W. There is further provided a light emitting diode 46 for emitting a reading light beam. The light beam emitted by the light emitting diode 46 is collimated by a collimator lens 59 and is reflected by the beam splitter 44. The reading light beam reflected by the beam splitter 44 is made incident upon the optical card 5 by means of the objective lens 45 to form the reading light spot R. In order to reproduce the information out of the optical card 5, the reading light beam reflected by the optical card 5 is collected by the objective lens 45, reflected by the beam splitter 44 and a reflection prism 48, and is made incident upon an imaging lens 49. The imaging lens 49 forms an image of a pit on the optical card 5 onto tracking error detecting photodetector 52 and focusing error detecting photodetector 53 by means of a reflection prism 50 and a plane parallel plate 51. By processing an output signal of the photodetector 52, it is possible to derive a tracking error signal. Similarly by processing an output signal from the photodetector 53, it is possible to produce a focusing error signal. The tracking and focusing servo control can be performed by using the thus derived tracking and focusing error signals in the known manner.

Figure 8:
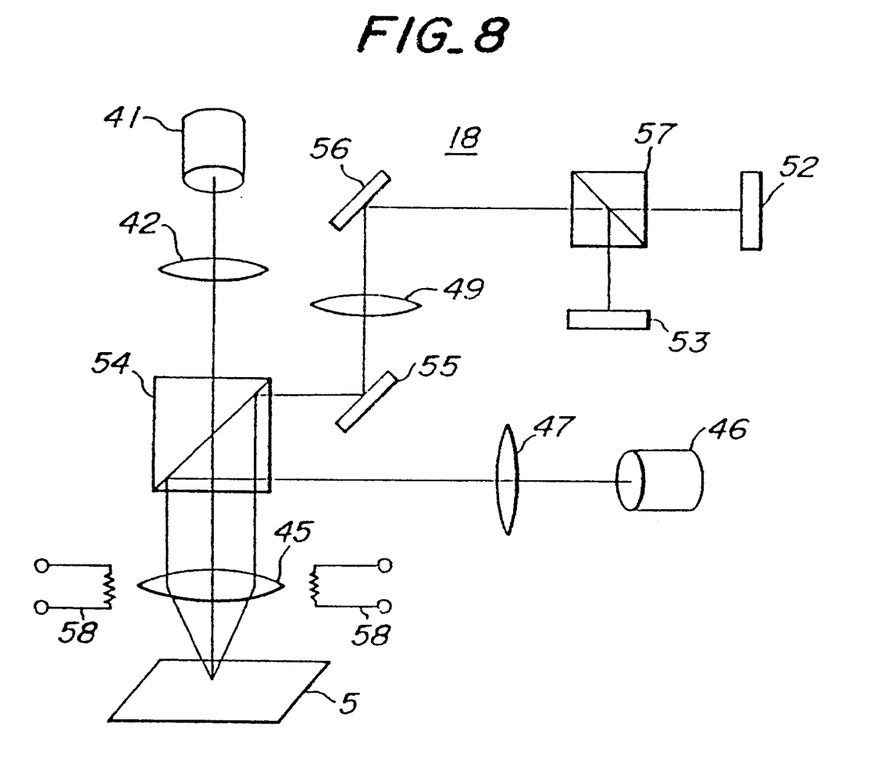
FIG. 8 is a schematic view depicting another embodiment of the optical head.

FIG. 8 is a schematic view showing another embodiment of the optical head 18 provided above the shuttle 11 shown in FIG. 6. In this embodiment, portions similar to those shown in FIG. 7 are denoted by the same reference numerals used in FIG. 7. In the present embodiment, the laser beam emitted by the laser diode 41 is made incident upon a polarizing beam splitter 54 without passing through the beam shape correcting prism 43. Further the reflection prisms 48 and 50 are replaced by plane mirrors 55 and 56, respectively, and the plane parallel plate 51 is replaced by a beam splitter 57. In the present embodiment, the objective lens 45 is moved in the focusing and tracking directions by means of actuators 58 in accordance with the focusing and tracking error signals. The information signal may be derived from the output signal of the tracking and/or focusing error detecting photodetectors 52 and 53. The remaining construction of the optical head of the present embodiment is same as that of the embodiment illustrated in FIG. 7.

Figure 5:
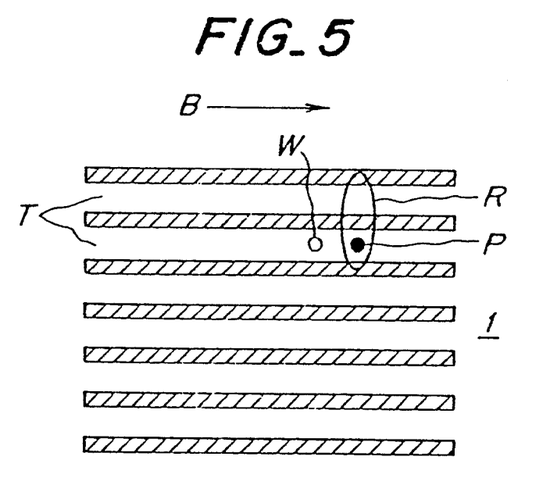
FIG. 5 is a positional relation of the writing and reading light spots on the optical card, while the optical card is moved in the second direction.
Figure 9:
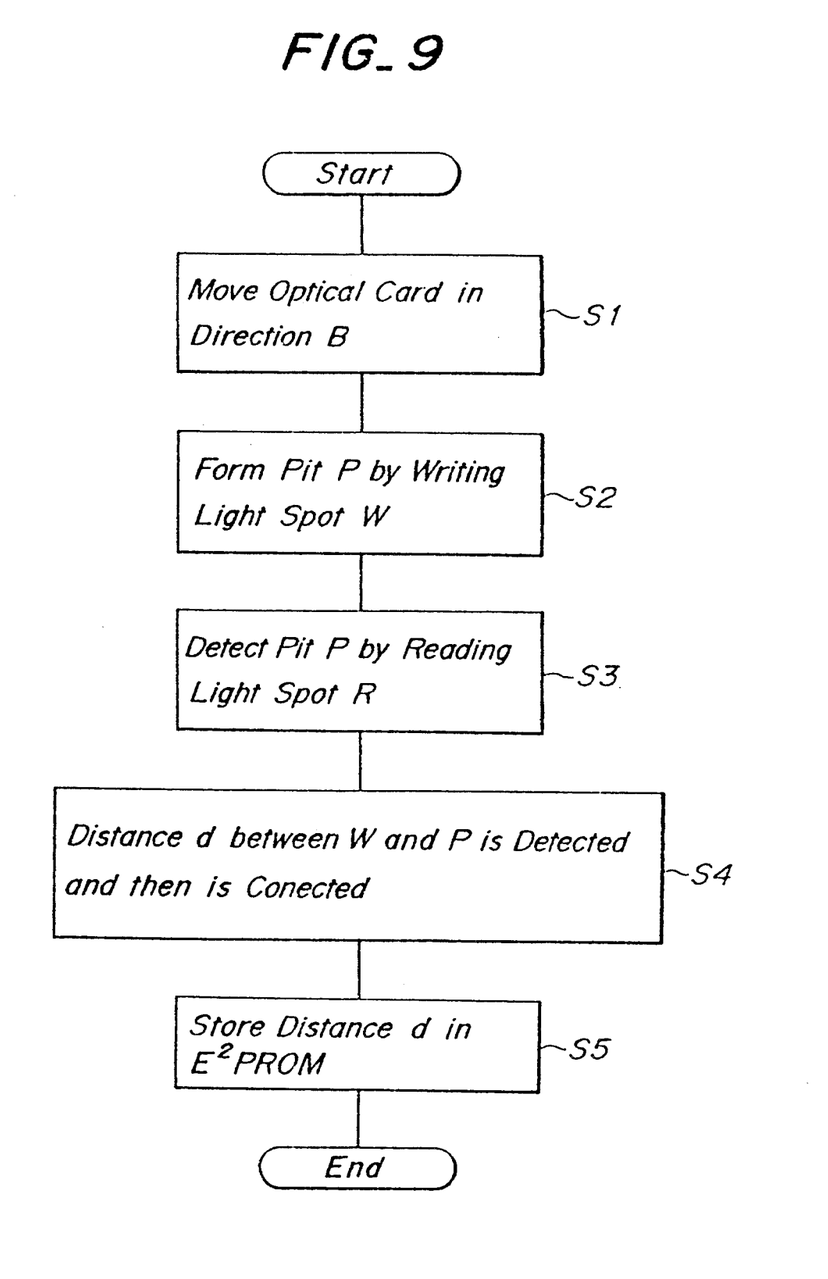
FIG. 9 is a flowchart representing successive steps of the distance measuring operation in the method according to the invention using the optical card of FIG. 2.

According to the basic aspect of the present invention, a distance d between the writing light spot W and the reading light spot R is measured by using these light spots. To this end, the optical card 1 is moved in a direction B which is opposite to the direction A for effecting the data recording. As stated above, the data recorded on the optical card 1 can be read out by moving the optical card in the both directions A and B, so that in the present embodiment, there is provided a distance measuring mode in which a pit can be recorded on the optical card even when the optical card is moved in the direction A. In the distance measuring mode, in a step S1 of the flow chart illustrated in FIG. 9, the optical card 1 is moved in the direction B at a predetermined constant speed which is same as that at which data is recorded on the optical card. At a suitable timing, the intensity of the writing light spot W is increased to a writing level in a pulsatory manner to form a pit P on the optical card 1 (step S2). As shown in FIG. 5, after the optical card 1 has moved over the distance d between the writing light spot W and the reading light spot R, the pit P is detected by the reading light spot R (step S3). Then, the distance d between the writing light spot W and the reading light spot R on the optical card 1 is measured (step S4). It should be noted that the distance d may be derived by detecting a time period from an instant at which the pit P is formed on the optical card 1 to a time instant at which the pit P is detected by the reading light spot R, and multiplying the thus detected time period by the constant moving speed of the optical card 1. Alternatively, the distance d may be measured by directly detecting an amount of the movement of the optical card during said time period. The thus measured distance d is dependent upon a delay due to the signal processing circuitry, because said time period contains the delay of the circuitry. An amount of this delay is dependent upon the construction of the circuitry, so that it may be assumed to be constant. Therefore, the measured distance d is corrected in accordance with the fixed delay of the signal processing circuitry. Then, the thus measured and corrected distance d is stored in a non-volatile memory such as EEPROM in a step S5. In this manner, the distance d between the writing light spot W and the reading light spot R on the optical card 1 can be measured accurately and reliably.

Figure 10:
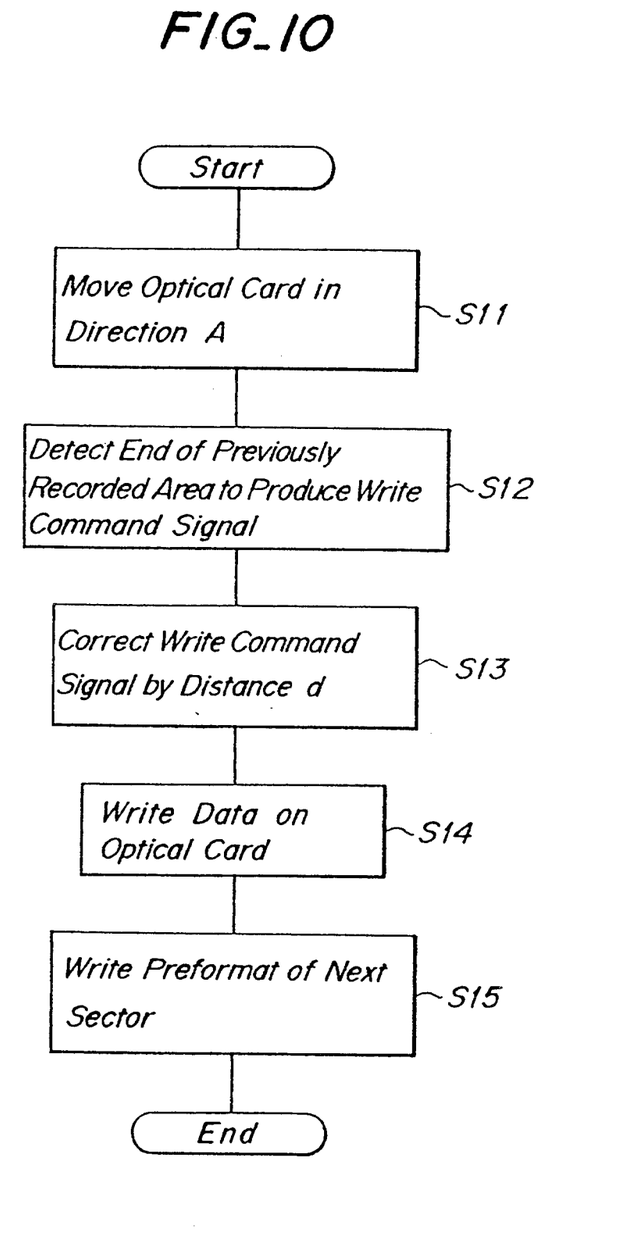
FIG. 10 is a flow chart showing successive steps of the data recording operation in the method according to the invention using the optical card shown in FIG. 2.

Next the data recording operation will be explained. At first, the optical card 1 is moved in the direction A at the predetermined constant speed as shown in a step S11 in the flow chart shown in FIG. 10, while the previously recorded area on the optical card is read out by means of the reading light spot R. When an end of the previously recorded area (the end of the synchronizing portion 35 in the preformat field shown in FIG. 1) is detected in step S12, there is produced a write command signal. Then, in a step S13, the write command signal is delay by a time period corresponding to the distance d stored in the non-volatile memory. Next, in a step S14 new data is written on the optical card by means of the writing light spot W in synchronism with the delayed write command signal such that the data is recorded immediately after the previously recorded preformat field of the relevant sector. Finally in a step S15, a preformat field of a next sector is record on the optical card 1 by modulating the intensity of the writing light spot W accordingly. In this manner, in the method according to the invention, the write command signal which is generated in response to the detection of the end of the previously recorded area, i.e. the end of the preformat field of the relevant sector, is delayed in accordance with the distance d which has been previously measured and stored in the memory such that the new data is recorded immediately after the end of the preformat field of the relevant sector without providing a gap therebetween or an overwrite. Therefore, there is not produced a bit jitter, and thus the recorded data can be read out precisely.

Figure 11:
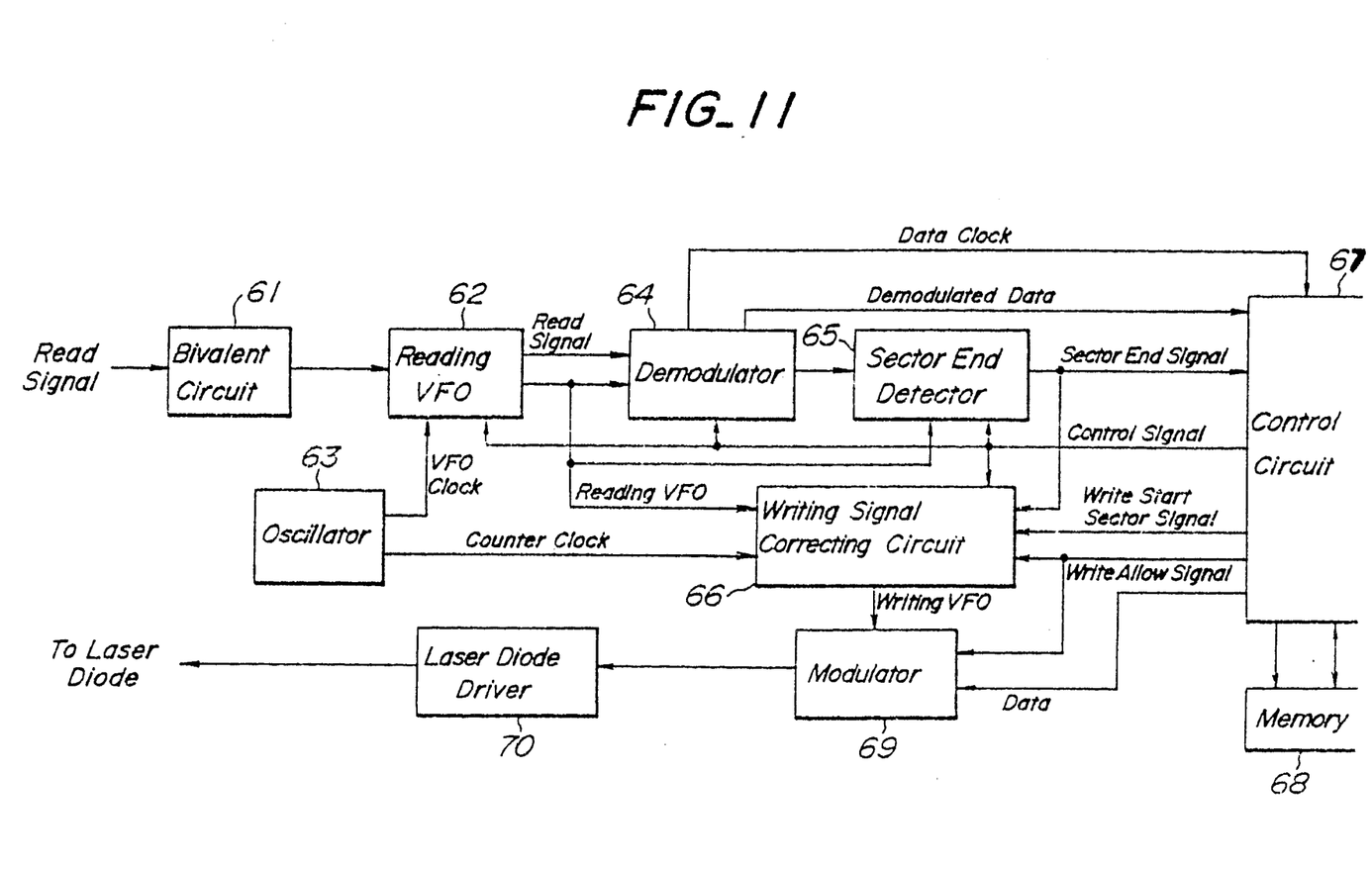
FIG. 11 is a circuit diagram showing an embodiment of the signal processing circuit.

FIG. 11 is a circuit diagram showing a signal processing circuit for writing new data on the optical card. The read signal obtained by scanning a pit pattern formed on the optical card is supplied to a bivalent circuit 61. The bivalent circuit 61 serves to produce a pulsatory bivalent signal at edges of pits by detecting level changes due to difference in the reflection coefficient between pit portions and non-pit portions of the optical card. The bivalent signal is supplied to a reading VFO circuit 62 to which is also supplied a VFO clock from an oscillator 63. The VFO circuit 62 generates a reading VFO signal on the basis of the bivalent signal by utilizing the VFO clock. The reading VFO signal thus produced is supplied to demodulator circuit 64, sector end detecting circuit 65 and writing signal correcting circuit 66. The reading VFO circuit 62 also generates a read signal which contains the clock and is synchronized with the clock. Further, the oscillator 63 also generates a counter clock having a frequency which is higher than the VFO clock by hundred times.

The synchronized read signal and the reading VFO signal are supplied to the demodulator circuit 64 which demodulates the read signal by utilizing the reading VFO signal. In this case, the demodulator circuit 64 sends the demodulated data including the clock to the sector end detecting circuit 65 and at the same time the demodulator circuit 64 sends the separated data clock and demodulated data to a control circuit 67.

The sector end detecting circuit 65 includes a shift register which latches the demodulated data including the clock in response to the reading VFO signal. The sector end detecting circuit 65 detects that the output pattern of the shift register becomes identical with the synchronizing pattern (synchronizing pattern 35 in FIG. 1) recorded on the optical card. Then the sector end detecting circuit 65 sends a sector end signal to the control circuit 67 as well as to the writing signal correcting circuit 66. The control circuit 67 controls the reading VFO circuit 62, demodulating circuit 64, sector end detecting circuit 65 and writing signal correcting circuit 66. Further data including a track number and a sector number in which new data is to be written is supplied to the control circuit 67. The control circuit 67 sends this data to a memory 68 and compares the track number and sector number indicated by the demodulated data with the stored track number and sector number. That is to say, the control circuit 67 comprises a shift register which latches the demodulated data at the timing of the data clock. The control circuit 67 checks CRC on the basis of the output of the shift register, and when it has been confirmed that the data is correctly demodulated, it is further judged that the track number and sector number indicated by the output of the shift register are identical with the track number and sector number stored in the memory 68. When these track numbers and sector numbers are confirmed to be identical with each other, the control circuit 67 generates a write start sector signal. It should be noted that the write start sector signal is generated while the synchronizing pattern is scanned. This write start sector signal is supplied to the write signal correcting circuit 66 at such a timing that the new data can be written on the optical card continuously without producing a gap or overwrite. That is to say, the previously measured distance between the writing light spot and the reading light spot is supplied to the control circuit 67, and the timing of the generation of the write sector start signal is adjusted in accordance with the distance. The control circuit 67 supplies a write allow signal to the write signal correcting circuit 66 and modulating circuit 69 for a time interval from an instant at which both the write start sector signal and sector end signal have the logic high level "H" to an end of the writing operation. The new data to be written on the optical card is supplied from the control circuit 67 to the modulating circuit 69, and a modulated signal is supplied to a laser diode driving circuit 70. A driving signal generated by the driving circuit 70 is supplied to the laser diode 41 shown in FIG. 7 or 8.

Figure 12:
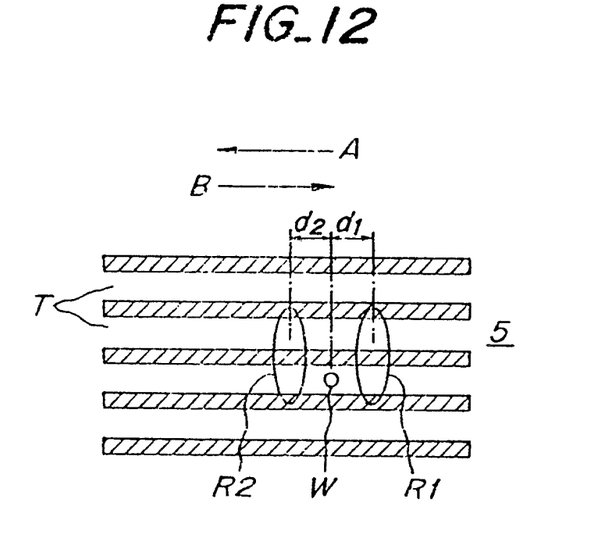
FIG. 12 is a positional relation of the writing and reading light spots on the optical card illustrated in FIG. 3.

When the optical card 5 shown in FIG. 3 is used, the writing operation is performed while the optical card is moved in both the directions A and B. To this end there are provided two reading light spots R1 and R2 on both sides of the writing light spot W as illustrated in FIG. 12. Since a distance d1 between the writing light spot W and the first reading light spot R1 is generally different from a distance d2 between the writing light spot W and the second reading light spot R2, so that these distances d1 and d2 have to be measured by moving the optical card 5 in the direction A and B, respectively. In this case, it is no longer necessary to provide the distance measurement mode. Also in this case, the measured and corrected distances d1 and d2 are stored in the nonvolatile memory such as EEPROM.

Figure 13:
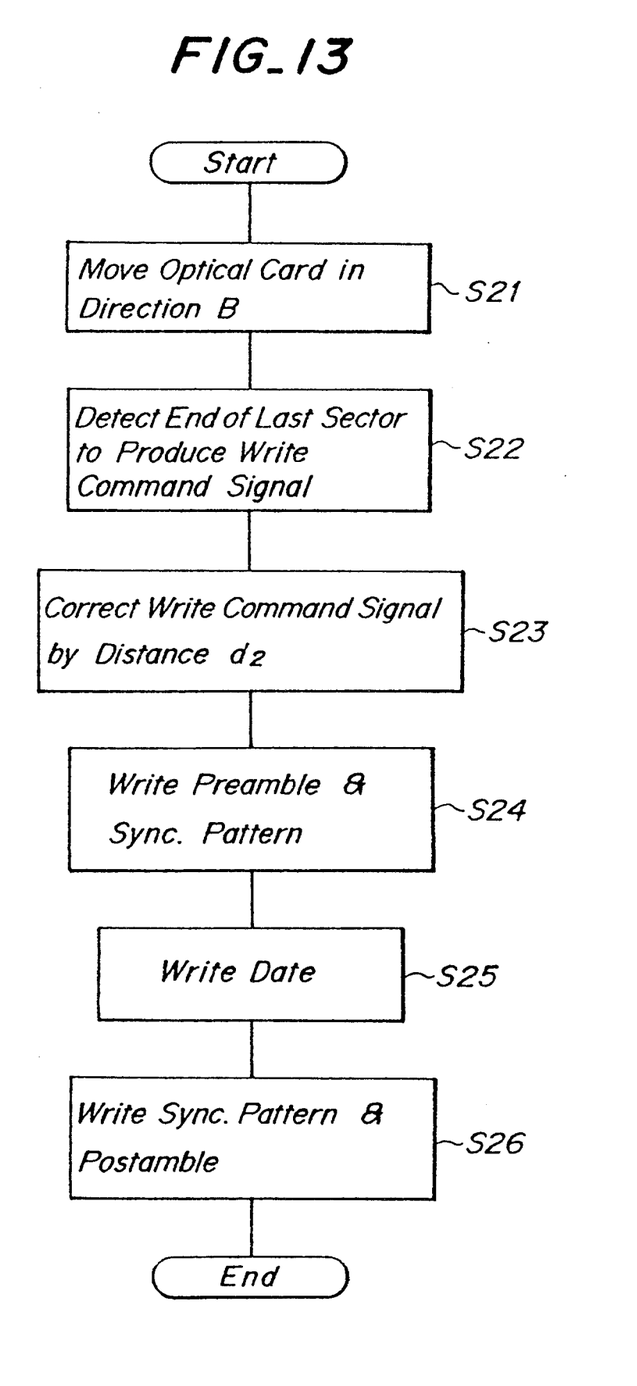
FIG. 13 is a flow chart representing the data recording operation for the optical card shown in FIG. 3.

FIG. 13 is a flow chart showing successive steps for recording data on such an optical card 5. In a first step S21, the optical card 5 is moved in the direction, e.g. in the direction B, and the previously recorded area is scanned by the second reading light spot R2. When the end of the sector which has been recorded last is detected by the second reading light spot R2, there is produced a write command signal in a step S22. Then, the thus detected write command signal is delayed by the distance d2 stored in the memory in a step S23 to produce a corrected write command signal. Next, in a step S24, a preamble and a synchronizing pattern are recorded by the writing light spot W immediately after the end of the previously recorded sector without forming a gap therebetween. Subsequently, in a step S24, new data is recorded with the aid of the writing light spot W. Finally, in a step S25, a synchronizing pattern and a postamble are recorded by modulating the intensity of the writing light spot W accordingly. In this manner, the successive sectors can be recorded at precisely determined positions on the optical card 5 without providing a gap therebetween and an overwritten portion.

When the data is to be recorded by moving the optical card 5 in the opposite direction A, the end of the previously recorded sector is detected by the first reading light spot R1, and the write command signal is delayed by the distance d1.

In the above embodiment, the distances d1 and d2 are measured separately, but when a difference between these distances is negligibly small, it is sufficient to measure and store only one distance.

In case of measuring the distance between the writing light spot and the reading light spot formed on the optical card, it is necessary to form the special pit P (see FIG. 5) on the optical card. This pit has to be recorded on the optical card at such a position that the pit P does not affect the useful data. To this end, a user area is provided in the data record area on the optical card. However, the distance between the writing light spot and the reading light spot formed on the optical card is hardly changed during the usage of the apparatus, so that it is usually sufficient to measure the distance when the apparatus is dispatched from a factory. In this case, the distance may be measured by using a special optical card instead of generally used optical cards.

The present invention is not limited to the embodiments explained above, but many modifications and alternations may be conceived by those skilled in the art within the scope of the invention. For instance, in the above embodiments, the distance between the writing light spot and the reading light spot is measured by actually recording the special pit on the optical card. However, according to the invention, said distance may be measured without forming the special pit. To this end, the intensity of the writing light spot is made adjustable to the reading intensity level, and the pit can be detected by this writing light spot having the reading intensity level. Then, a pit which has been previously recorded on the optical card is first detected by the writing light spot having the reading intensity level, and the the same pit is detected by the reading light spot. The distance between the writing light spot and the reading light spot may be derived from a time period between these detections. In this case, the pit to be used for measuring the distance may be selected from the preformat, e.g. the last pit of the synchronizing pattern. When the distance is measured in such a manner, it is no longer necessary to record a special pit on the optical card, so that the measurement of the distance may be performed each time new data is to be recorded on the optical card.

As explained above in detail, in the method according to the invention, the write command signal is corrected by the distance between the writing light spot and the reading light spot on the optical card, so that the new data can be recorded at a correct position with respect to the previously recorded data, and therefore successive sectors can be formed without providing a gap therebetween, and the bit jitter can be suppressed. Therefore, the recorded data can be read out accurately.

What is claimed is:

1. A method of writing and reading information on and from a card-like optical record medium comprising the steps of:

projecting a writing light beam onto the optical record medium to form a writing light spot;

projecting a reading light beam onto the optical record medium to form a reading light spot at a position which is separated from a position at which said writing light spot is formed;

measuring a distance between said writing light spot and said reading light spot formed on the optical record medium by using the writing and reading light spots;

storing said measured distance between said writing light spot and said reading light spot formed on the optical record medium;

generating a write command signal by reading a previously recorded area on the optical record medium;

correcting a timing of said write command signal in accordance with said measured distance such that new data can be written on the optical record medium immediately after an end of said previously recorded area to produce a corrected write command signal; and recording the new data on the optical record medium by said writing light beam in response to said corrected write command signal.

2. A method according to claim 1, wherein said distance between the writing light spot and the reading light spot on the optical record medium is measured as a product of a constant moving speed of the optical record medium and a time period from a time instant at which a pit is formed on the optical record medium by said writing light spot to a time instant at which said pit on the optical record medium is read out by said reading light spot.

3. A method according to claim 1, wherein said distance between the writing light spot and the reading light spot on the optical record medium is measured by directly detecting a distance over which the optical record medium has moved during a time period from a time instant at which a pit is formed on the optical record medium by said writing light spot to a time instant at which said pit on the optical record medium is read out by said reading light spot.

4. A method according to claim 1, wherein said measured distance is stored in a non-volatile memory.

5. A method according to claim 1, wherein after measuring the distance between the writing light spot and the reading light spot, the measured distance is corrected in accordance with a delay due to a signal processing circuitry.

6. A method according to claim 1, wherein said step of generating a write command signal by reading said previously recorded area on the optical card medium comprises identifying a synchronizing pattern formed in said previously recorded area and locating said end of said previously recorded area in accordance with identification of said synchronizing pattern.

7. A method of writing and reading information on and from a card-like optical record medium comprising the steps of:

projecting a writing light beam onto the optical record medium to form a writing light spot;

projecting first and second reading light beams onto the optical record medium to form first and second reading light spots at first and second positions which are separated from a position at which said writing light spot is formed;

measuring a first distance between said writing light spot and said first reading light spot by using said writing light spot and said first reading light spot;

measuring a second distance between said writing light spot and said second reading light spot by using said writing light spot and said second reading light spot;

storing said measured first and second distances;

generating a write command signal by reading a previously recorded area on said optical record medium;

correcting a timing of said write command signal in accordance with one of said first and second measured distances such that new data can be written on said optical record medium immediately after an end of said previously recorded area to produce a corrected write command signal; and recording said new data on said optical record medium by said writing light beam in response to said corrected write command signal.

8. A method according to claim 7, wherein said writing light spot is disposed between said first and second reading light spots.

9. A method according to claim 7, wherein each of said first and second distances is measured as a product of a constant moving speed of the optical record medium and a time period from a time instant in which a pit is formed on the optical record medium by said writing light spot to a time instant at which said pit on the optical record medium is read out by one of said first and second reading light spots.

10. A method according to claim 7, wherein each of said first and second distances is measured by directly detecting a distance over which the optical record medium has moved during a time period from a time instant at which a pit is formed on the optical record medium by said writing light spot to a time instant at which said pit on the optical record medium is read out by one of said first and second reading light spots.

11. A method according to claim 7, wherein said measured first and second distance are stored in a non-volatile memory.

12. A method according to claim 7, wherein after measuring the first and second distances, the measured first and second distances are corrected in accordance with a delay due to a signal processing circuitry.

* * * * *